US011675659B2

(12) United States Patent
Magro et al.

(10) Patent No.: US 11,675,659 B2
(45) Date of Patent: Jun. 13, 2023

(54) DDR MEMORY ERROR RECOVERY

(71) Applicants: Advanced Micro Devices, Inc., Santa Clara, CA (US); ATI Technologies ULC, Markham (CA)

(72) Inventors: James R. Magro, Austin, TX (US); Ruihua Peng, San Jose, CA (US); Anthony Asaro, Markham (CA); Kedarnath Balakrishnan, Bangalore (IN); Scott P. Murphy, Sunnyvale, CA (US); YuBin Yao, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 508 days.

(21) Appl. No.: 15/375,076

(22) Filed: Dec. 9, 2016

(65) Prior Publication Data

US 2018/0018221 A1 Jan. 18, 2018

Related U.S. Application Data

(60) Provisional application No. 62/363,075, filed on Jul. 15, 2016.

(51) Int. Cl.
*G06F 11/10* (2006.01)
*G06F 13/16* (2006.01)
*G06F 13/40* (2006.01)

(52) U.S. Cl.
CPC .......... *G06F 11/1016* (2013.01); *G06F 11/10* (2013.01); *G06F 13/1626* (2013.01); *G06F 13/4022* (2013.01)

(58) Field of Classification Search
CPC ................. G06F 11/1016; G06F 11/10; G06F 13/1626; G06F 13/4022; G06F 11/3672;
(Continued)

(56) References Cited

U.S. PATENT DOCUMENTS 6,038,674 A * 3/2000 Sasaki ................. G06F 12/0808
710/45
6,128,747 A 10/2000 Thoulon
(Continued)

OTHER PUBLICATIONS

European Search Report for EPO Application No. EP16203781, dated Jun. 28, 2017, 4 pages.
(Continued)

*Primary Examiner* — Albert Decady
*Assistant Examiner* — Enam Ahmed
(74) *Attorney, Agent, or Firm* — Polansky & Associates, P.L.L.C.; Paul J. Polansky

(57) ABSTRACT

In one form, a memory controller includes a command queue, an arbiter, and a replay queue. The command queue receives and stores memory access requests. The arbiter is coupled to the command queue for providing a sequence of memory commands to a memory channel. The replay queue stores the sequence of memory commands to the memory channel, and continues to store memory access commands that have not yet received responses from the memory channel. When a response indicates a completion of a corresponding memory command without any error, the replay queue removes the corresponding memory command without taking further action. When a response indicates a completion of the corresponding memory command with an error, the replay queue replays at least the corresponding memory command. In another form, a data processing system includes the memory controller, a memory accessing agent, and a memory system to which the memory controller is coupled.

27 Claims, 5 Drawing Sheets

(58) Field of Classification Search
CPC ............... G06F 9/3855; G06F 11/1008; G06F 13/1605; H04L 43/50; H04L 41/22; H04L 51/04
USPC .......................................................... 714/768
See application file for complete search history.

(56) References Cited

U.S. PATENT DOCUMENTS

| | | | | |
|---|---|---|---|---|
| 6,256,745 | B1* | 7/2001 | Sager | G06F 1/06 712/32 |
| 8,132,048 | B2* | 3/2012 | Blackmon | G06F 11/141 711/149 |
| 8,307,270 | B2* | 11/2012 | Kim | G06F 11/1028 365/120 |
| 8,365,015 | B1 | 1/2013 | Yu et al. | |
| 8,549,383 | B2* | 10/2013 | Sivaramakrishnan | G06F 11/1016 714/768 |
| 8,738,995 | B2* | 5/2014 | Emerson | G06F 11/1052 714/768 |
| 9,342,402 | B1* | 5/2016 | Ong | G06F 11/1056 |
| 10,270,705 | B1* | 4/2019 | Adelman | H04L 47/34 |
| 2003/0033511 | A1* | 2/2003 | Akkary | G06F 9/3855 712/235 |
| 2003/0126405 | A1* | 7/2003 | Sager | G06F 9/3836 712/200 |
| 2004/0153763 | A1 | 8/2004 | Grochowski et al. | |
| 2004/0153769 | A1 | 8/2004 | Lee et al. | |
| 2007/0226579 | A1* | 9/2007 | Alexander | G06F 11/106 714/758 |
| 2009/0010279 | A1* | 1/2009 | Tsang | H04L 47/22 370/468 |
| 2009/0094478 | A1* | 4/2009 | Harper | G06F 11/2025 714/3 |
| 2011/0040924 | A1 | 2/2011 | Selinger | |
| 2011/0258516 | A1* | 10/2011 | Salmon-Legagneur | G06F 21/54 714/768 |
| 2013/0066837 | A1* | 3/2013 | Colrain | G06F 16/2365 707/674 |
| 2014/0157085 | A1* | 6/2014 | Shalvi | G06F 11/14 714/768 |
| 2014/0223231 | A1* | 8/2014 | Mangold | G11C 16/16 714/22 |
| 2014/0281263 | A1 | 9/2014 | Deming et al. | |
| 2014/0317443 | A1* | 10/2014 | Bartlett | G11C 29/04 714/6.11 |
| 2014/0359395 | A1 | 12/2014 | Ellis et al. | |
| 2015/0186067 | A1* | 7/2015 | Shu | G06F 3/0626 711/103 |
| 2015/0339245 | A1* | 11/2015 | Chakraborty | G06F 13/1626 711/106 |
| 2016/0105411 | A1* | 4/2016 | Vallieres | H04L 9/0838 726/3 |
| 2018/0081691 | A1* | 3/2018 | Kulkarni | G06F 9/3838 |
| 2019/0278514 | A1* | 9/2019 | Chaturvedi | G11C 29/44 |
| 2019/0369913 | A1* | 12/2019 | Hahn | G06F 3/0619 |
| 2021/0382640 | A1* | 12/2021 | Mandava | G06F 3/0652 |

OTHER PUBLICATIONS

JEDEC Standard; "FBDIMM: Architecture and Protocol—JESD206"; white paper; Jan. 2007; JEDEC Solid State Technology Association; 2500 Wilson Blvd. Suite 220; Arlington, VA 22201; United States; 128 pages.

International Search Report and Written Opinion for International Application No. PCT/US2017/041559, dated Oct. 24, 2017, 12 pages.

* cited by examiner

DDR MEMORY ERROR RECOVERY

This application claims priority to U.S. Provisional Application No. 62/363,075, filed Jul. 15, 2016, entitled "DDR Memory Error Recovery".

BACKGROUND

Computer systems typically use inexpensive and high-density dynamic random access memory (DRAM) chips for main memory. Most DRAM chips sold today are compatible with various double data rate (DDR) DRAM standards promulgated by the Joint Electron Devices Engineering Council (JEDEC). DDR memory controllers are used to manage the interface between various memory accessing agents and DDR DRAMs according to published DDR standards.

Modern DDR memory controllers maintain queues to store pending memory access requests to allow them to pick the pending memory access requests out of order in relation to the order in which they were generated or stored to increase efficiency. For example, the memory controllers can retrieve multiple memory access requests to the same row in a given rank of memory from the queue and issue them consecutively to the memory system to avoid the overhead of precharging the current row and activating another row.

DDR memory systems include a variety of mechanisms for error detection and recovery, such as parity bits, cyclic redundancy codes (CRCs), error detection code (EDC), or other error correcting codes (ECCs) that are stored along with the data in the DDR DRAMs. When performing memory accesses, DDR memory controllers compare the stored CRC or ECC bits to CRC or ECC bits calculated with the memory access. In response to detecting an error, the DDR memory controller corrects the error if possible, and reports the error to the operating system, and the operating system determines further corrective action to be taken. However DRAM buses operate at relatively high clock rates, such as 2400 MegaHertz (MHz), and transfer data on both transitions of the clock cycle. Because of the high data rates, DDR memory buses are susceptible to occasional random errors or "glitches" on the memory bus. While known DDR memory controllers have mechanisms to detect and correct these errors, the mechanisms reduce system performance significantly due to the overhead caused by the operating system calls.

Figure 1:
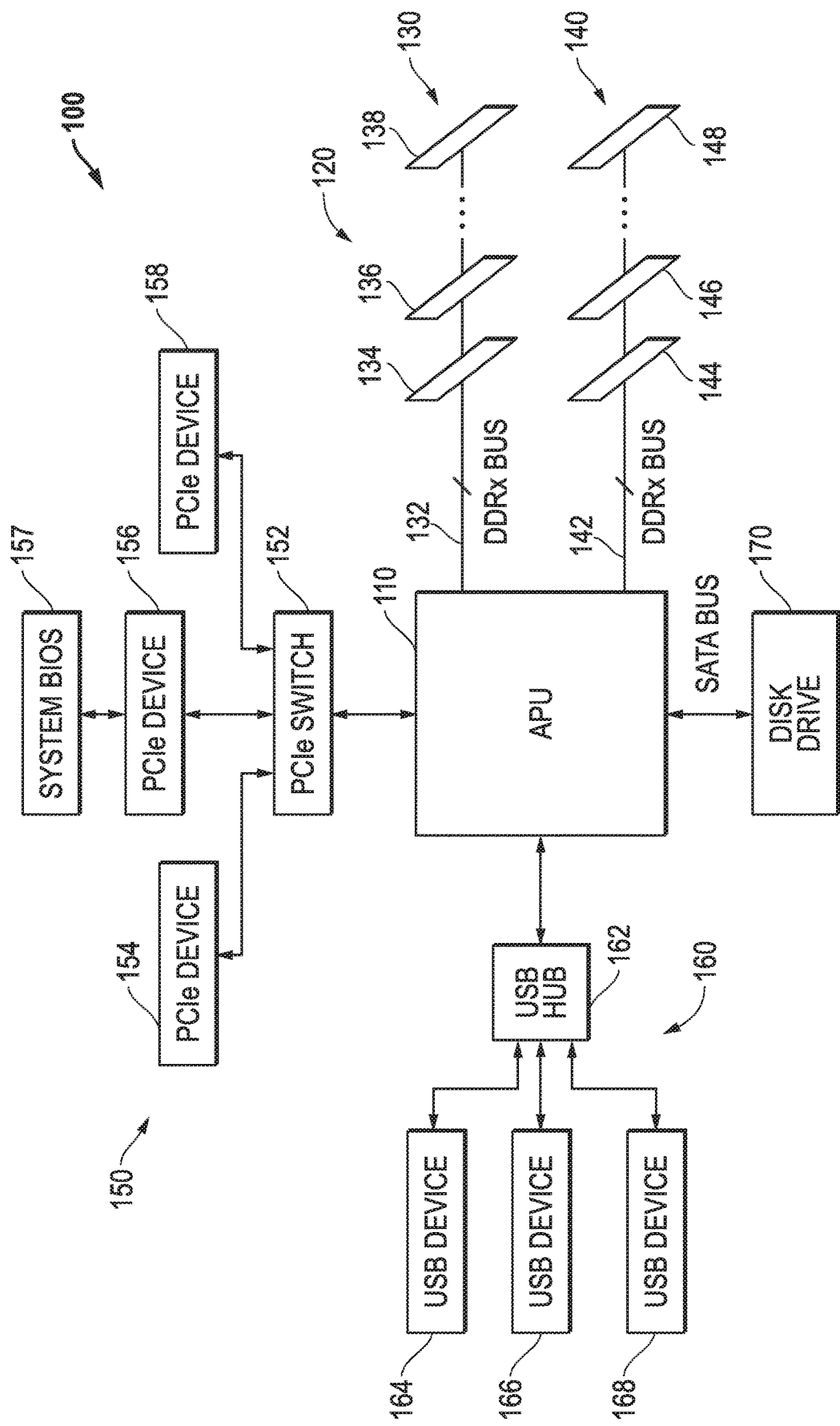
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form, a memory controller includes a command queue, an arbiter, and a replay queue. The command queue receives and stores memory access requests. The arbiter is coupled to the command queue for providing a sequence of memory commands to a memory channel. The replay queue stores the sequence of memory commands to the memory channel, and continues to store memory access commands that have not yet received responses from the memory channel. When a response indicates a completion of a corresponding memory command without any error, the replay queue removes the corresponding memory command without taking further action. When a response indicates a completion of the corresponding memory command with an error, the replay queue replays at least the corresponding memory command.

In another form, a memory controller includes a command queue, an arbiter, a memory interface queue, and a replay queue. The command queue receives and stores memory access requests. The arbiter is coupled to the command queue for providing a sequence of memory commands to a memory channel. The memory interface queue is coupled to the command queue for receiving and storing memory access requests. The replay queue is coupled to the memory interface queue and stores the sequence of memory commands to the memory channel, and continues to store memory access commands that have not yet received responses from the memory channel. The memory controller remains in a normal state as long as it does not detect any errors, wherein in the normal state the memory interface queue continues to receive commands from the command queue that are picked by the arbiter. In response to detecting an error, the memory controller enters a recovery state in which the replay queue replays at least one corresponding memory command by sending the at least one corresponding memory command to the memory interface queue.

In yet another form, a data processing system includes a memory accessing agent, a memory system, and a memory controller. The memory accessing agent provides memory access requests. The memory controller is coupled to the memory accessing agent and the memory system. The memory controller includes a command queue, an arbiter, and a replay queue. The command queue receives and stores memory access requests. The arbiter is coupled to the command queue for providing a sequence of memory commands to the memory system. The replay queue stores the sequence of memory commands to the memory channel, and continues to store memory access commands that have not yet received responses from the memory system. When a response indicates a completion of a corresponding memory command without any error, the replay queue removes the corresponding memory command without taking further action. When a response indicates a completion of the corresponding memory command with an error, the replay queue replays at least the corresponding memory command.

In still another form, a method includes receiving and storing memory access requests. A sequence of memory commands are provided to a memory channel from stored memory access requests, and memory commands that have not yet received error-free responses from the memory channel continue to be stored. Whether or not a memory error occurred is detected in responses received from the memory channel. In response to detecting no memory errors, a memory controller remains in a normal state, and while in the normal state commands continue to be provided from among stored memory access requests. In response to detecting an error, a recovery state is entered, and while in the recovery state stored memory commands are replayed starting from a corresponding memory command at which the error occurred.

FIG. 1 illustrates in block diagram form a data processing system 100 according to some embodiments. Data processing system 100 includes generally a data processor 110 in the form of an accelerated processing unit (APU), a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a DDRx bus 132, including representative DIMMs 134, 136, and 138 that in this example correspond to separate ranks. Likewise memory channel 140 includes a set of DIMMs connected to a DDRx bus 142, including representative DIMMs 144, 146, and 148.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like.

Data processing system 100 is suitable for use in modern computing applications by providing a memory channel 130 and a memory channel 140. Each of memory channels 130 and 140 can connect to state-of-the-art DDR memories such as DDR version four (DDR4), low power DDR4 (LPDDR4), graphics DDR version five (gDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Figure 2:
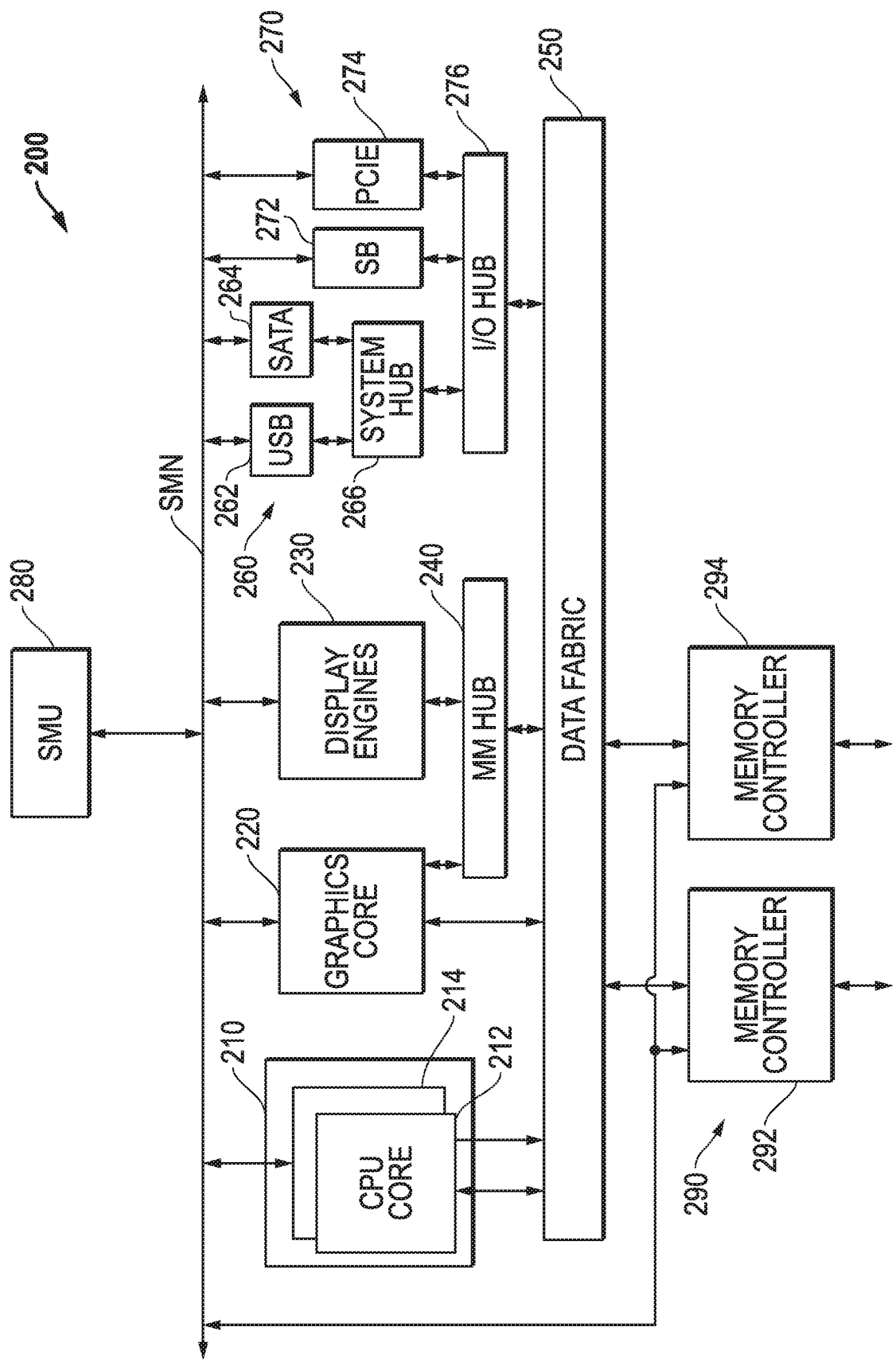
FIG. 2 illustrates in block diagram form an accelerated processing unit (APU) suitable for use in the data processing system of FIG. 1.

FIG. 2 illustrates in block diagram form an APU 200 suitable for use in data processing system 100 of FIG. 1. APU 200 includes generally a central processing unit (CPU) core complex 210, a graphics core 220, a set of display engines 230, a memory management hub 240, a data fabric 250, a set of peripheral controllers 260, a set of peripheral bus controllers 270, a system management unit (SMU) 280, and a set of memory controllers 290.

CPU core complex 210 includes a CPU core 212 and a CPU core 214. In this example, CPU core complex 210 includes two CPU cores, but in other embodiments CPU core complex can include an arbitrary number of CPU cores. Each of CPU cores 212 and 214 is bidirectionally connected to a system management network (SMN), which forms a control fabric, and to data fabric 250, and is capable of providing memory access requests to data fabric 250. Each of CPU cores 212 and 214 may be unitary cores, or may further be a core complex with two or more unitary cores sharing certain resources such as caches.

Graphics core 220 is a high performance graphics processing unit (GPU) capable of performing graphics operations such as vertex processing, fragment processing, shading, texture blending, and the like in a highly integrated and parallel fashion. Graphics core 220 is bidirectionally connected to the SMN and to data fabric 250, and is capable of providing memory access requests to data fabric 250. In this regard, APU 200 may either support a unified memory architecture in which CPU core complex 210 and graphics core 220 share the same memory space, or a memory architecture in which CPU core complex 210 and graphics core 220 share a portion of the memory space, while graphics core 220 also uses a private graphics memory not accessible by CPU core complex 210.

Display engines 230 render and rasterize objects generated by graphics core 220 for display on a monitor. Graphics core 220 and display engines 230 are bidirectionally connected to a common memory management hub 240 for uniform translation into appropriate addresses in memory system 120, and memory management hub 240 is bidirectionally connected to data fabric 250 for generating such memory accesses and receiving read data returned from the memory system.

Data fabric 250 includes a crossbar switch for routing memory access requests and memory responses between any memory accessing agent and memory controllers 290. It also includes a system memory map, defined by BIOS, for determining destinations of memory accesses based on the system configuration, as well as buffers for each virtual connection.

Peripheral controllers 260 include a USB controller 262 and a SATA interface controller 264, each of which is bidirectionally connected to a system hub 266 and to the SMN bus. These two controllers are merely exemplary of peripheral controllers that may be used in APU 200.

Peripheral bus controllers 270 include a system controller or "Southbridge" (SB) 272 and a PCIe controller 274, each of which is bidirectionally connected to an input/output (I/O) hub 276 and to the SMN bus. I/O hub 276 is also bidirectionally connected to system hub 266 and to data fabric 250. Thus for example a CPU core can program registers in USB controller 262, SATA interface controller 264, SB 272, or PCIe controller 274 through accesses that data fabric 250 routes through I/O hub 276.

SMU 280 is a local controller that controls the operation of the resources on APU 200 and synchronizes communication among them. SMU 280 manages power-up sequencing of the various processors on APU 200 and controls multiple off-chip devices via reset, enable and other signals. SMU 280 includes one or more clock sources not shown in FIG. 2, such as a phase locked loop (PLL), to provide clock signals for each of the components of APU 200. SMU 280 also manages power for the various processors and other functional blocks, and may receive measured power consumption values from CPU cores 212 and 214 and graphics core 220 to determine appropriate power states.

APU 200 also implements various system monitoring and power saving functions. In particular one system monitoring function is thermal monitoring. For example, if APU 200 becomes hot, then SMU 280 can reduce the frequency and voltage of CPU cores 212 and 214 and/or graphics core 220. If APU 200 becomes too hot, then it can be shut down entirely. Thermal events can also be received from external sensors by SMU 280 via the SMN bus, and SMU 280 can reduce the clock frequency and/or power supply voltage in response.

Figure 3:
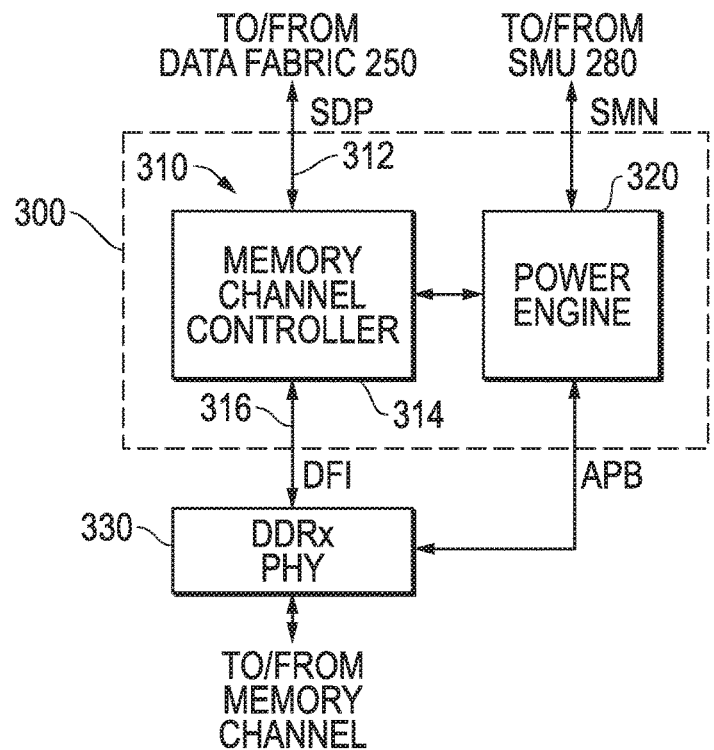
FIG. 3 illustrates in block diagram form a memory controller and associated physical interface (PHY) suitable for use in the APU of FIG. 2 according to some embodiments.

FIG. 3 illustrates in block diagram form a memory controller 300 and an associated physical interface (PHY) 330 suitable for use in APU 200 of FIG. 2 according to some embodiments. Memory controller 300 includes a memory channel 310 and a power engine 320. Memory channel 310 includes a host interface 312, a memory channel controller 314, and a physical interface 316. Host interface 312 bidirectionally connects memory channel controller 314 to data fabric 250 over a scalable data port (SDP). Physical interface 316 bidirectionally connects memory channel controller 314 to PHY 330 over a bus that conforms to the DDR-PHY Interface Specification (DFI). Power engine 320 is bidirectionally connected to SMU 280 over the SMN bus, to PHY 330 over the Advanced Peripheral Bus (APB), and is also bidirectionally connected to memory channel controller 314. PHY 330 has a bidirectional connection to a memory channel such as memory channel 130 or memory channel 140 of FIG. 1. Memory controller 300 is an instantiation of a memory controller for a single memory channel using a single memory channel controller 314, and has a power engine 320 to control operation of memory channel controller 314 in a manner that will be described further below.

Figure 4:
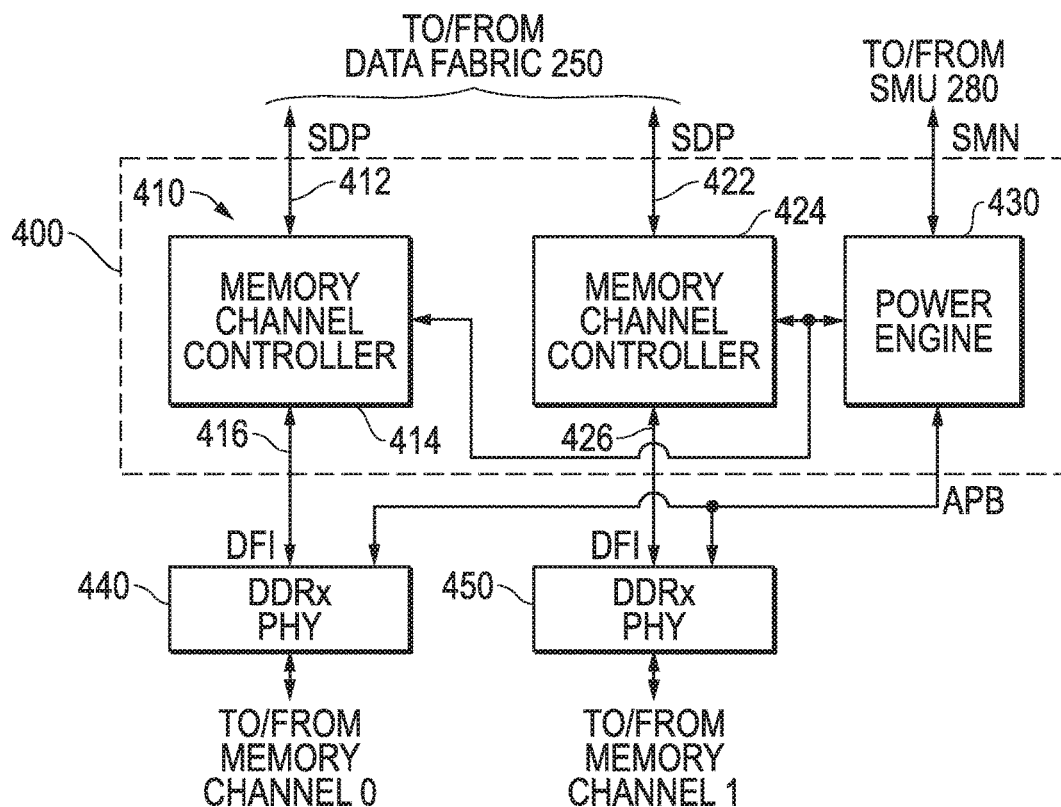
FIG. 4 illustrates in block diagram form another memory controller and associated PHY suitable for use in the APU of FIG. 2 according to some embodiments.

FIG. 4 illustrates in block diagram form another memory controller 400 and associated PHYs 440 and 450 suitable for use in APU 200 of FIG. 2 according to some embodiments. Memory controller 400 includes memory channels 410 and 420 and a power engine 430. Memory channel 410 includes a host interface 412, a memory channel controller 414, and a physical interface 416. Host interface 412 bidirectionally connects memory channel controller 414 to data fabric 250 over an SDP. Physical interface 416 bidirectionally connects memory channel controller 414 to PHY 440, and conforms to the DFI Specification. Memory channel 420 includes a host interface 422, a memory channel controller 424, and a physical interface 426. Host interface 422 bidirectionally connects memory channel controller 424 to data fabric 250 over another SDP. Physical interface 426 bidirectionally connects memory channel controller 424 to PHY 450, and conforms to the DFI Specification. Power engine 430 is bidirectionally connected to SMU 280 over the SMN bus, to PHYs 440 and 450 over the APB, and is also bidirectionally connected to memory channel controllers 414 and 424. PHY 440 has a bidirectional connection to a memory channel such as memory channel 130 of FIG. 1. PHY 450 has a bidirectional connection to a memory channel such as memory channel 140 of FIG. 1. Memory controller 400 is an instantiation of a memory controller having two memory channel controllers and uses a shared power engine 430 to control operation of both memory channel controller 414 and memory channel controller 424 in a manner that will be described further below.

Figure 5:
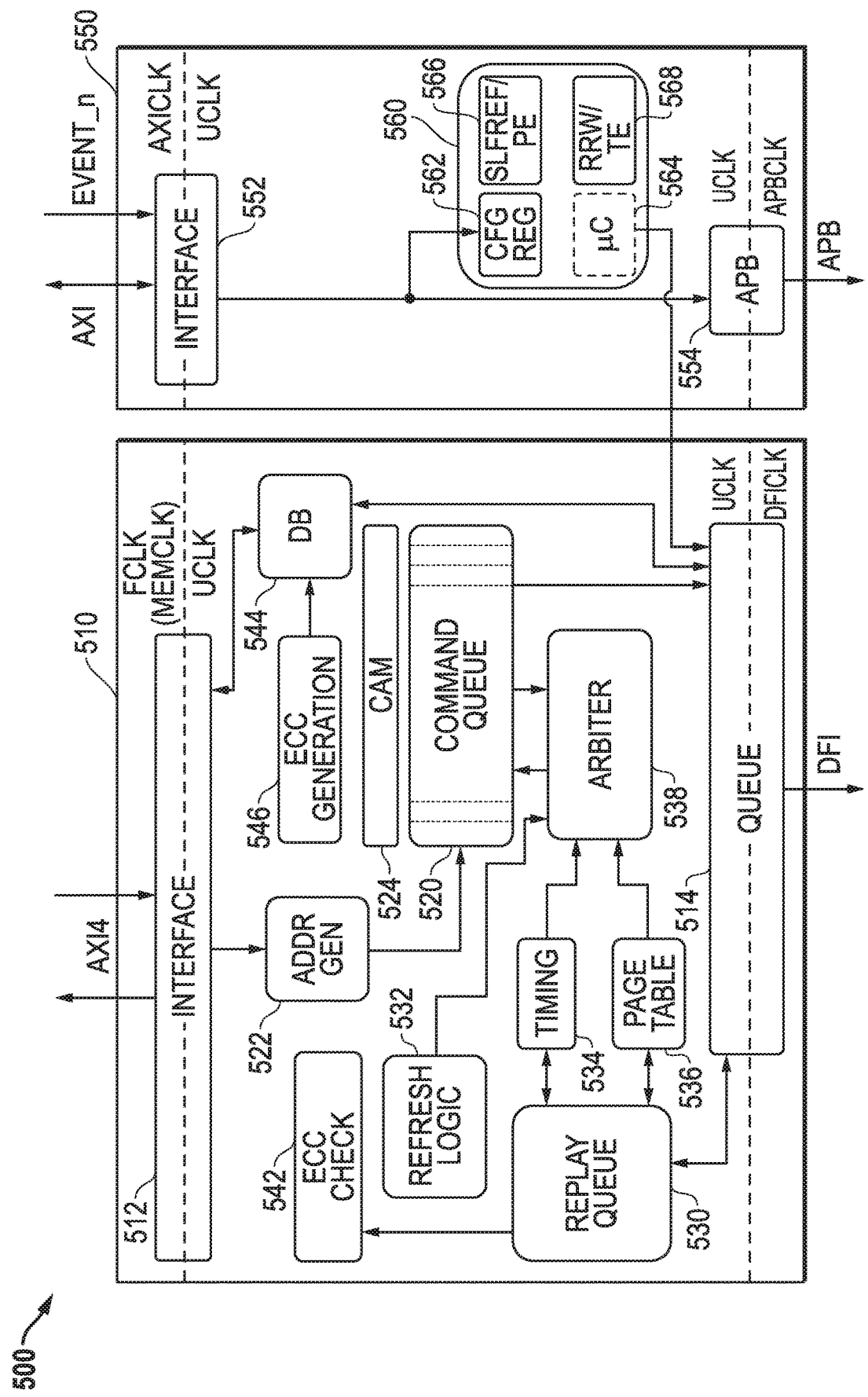
FIG. 5 illustrates in block diagram form a memory controller according to some embodiments.

FIG. 5 illustrates in block diagram form a memory controller 500 according to some embodiments. Memory controller 500 includes generally a memory channel controller 510 and a power controller 550. Memory channel controller 510 includes generally an interface 512, a queue 514, a command queue 520, an address generator 522, a content addressable memory (CAM) 524, a replay queue 530, a refresh logic block 532, a timing block 534, a page table 536, an arbiter 538, an error correction code (ECC) check block 542, an ECC generation block 544, and a data buffer (DB) 546.

Interface 512 has a first bidirectional connection to data fabric 250 over an external bus, and has an output. In memory controller 500, this external bus is compatible with the advanced extensible interface version four specified by ARM Holdings, PLC of Cambridge, England, known as "AXI4", but can be other types of interfaces in other embodiments. Interface 512 translates memory access requests from a first clock domain known as the FCLK (or MEMCLK) domain to a second clock domain internal to memory controller 500 known as the UCLK domain. Similarly, queue 514 provides memory accesses from the UCLK domain to the DFICLK domain associated with the DFI interface.

Address generator 522 decodes addresses of memory access requests received from data fabric 250 over the AXI4 bus. The memory access requests include access addresses in the physical address space represented in a normalized format. Address generator 522 converts the normalized addresses into a format that can be used to address the actual memory devices in memory system 120, as well as to efficiently schedule related accesses. This format includes a region identifier that associates the memory access request with a particular rank, a row address, a column address, a bank address, and a bank group. On startup, the system BIOS queries the memory devices in memory system 120 to determine their size and configuration, and programs a set of configuration registers associated with address generator 522. Address generator 522 uses the configuration stored in the configuration registers to translate the normalized addresses into the appropriate format. Command queue 520 is a queue of memory access requests received from the memory accessing agents in data processing system 100, such as CPU cores 212 and 214 and graphics core 220. Command queue 520 stores the address fields decoded by address generator 522 as well other address information that allows arbiter 538 to select memory accesses efficiently, including access type and quality of service (QoS) identifiers. CAM 524 includes information to enforce ordering rules, such as write after write (WAW) and read after write (RAW) ordering rules.

Replay queue 530 is a temporary queue for storing memory accesses picked by arbiter 538 that are awaiting responses, such as address and command parity responses, write cyclic redundancy check (CRC) responses for DDR4 DRAM or write and read CRC responses for GDDR5 DRAM. Replay queue 530 accesses ECC check block 542 to determine whether the returned ECC is correct or indicates an error. Replay queue 530 allows the accesses to be replayed in the case of a parity or CRC error of one of these cycles.

Refresh logic 532 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh logic 532 generates refresh commands periodically to prevent data errors caused by leaking of charge off storage capacitors of memory cells in DRAM chips. In addition, refresh logic 532 periodically calibrates ZQ to prevent mismatch in on-die termination resistance due to thermal changes in the system. Refresh logic 532 also decides when to put DRAM devices in different power down modes.

Arbiter 538 is bidirectionally connected to command queue 520 and is the heart of memory channel controller 510. It improves efficiency by intelligent scheduling of accesses to improve the usage of the memory bus. Arbiter 538 uses timing block 534 to enforce proper timing relationships by determining whether certain accesses in command queue 520 are eligible for issuance based on DRAM timing parameters. For example, each DRAM has a minimum specified time between activate commands to the same bank, known as "$t_{RC}$". Timing block 534 maintains a set of counters that determine eligibility based on this and other timing parameters specified in the JEDEC specification, and is bidirectionally connected to replay queue 530. Page table 536 maintains state information about active pages in each bank and rank of the memory channel for arbiter 538, and is bidirectionally connected to replay queue 530.

In response to write memory access requests received from interface 512, ECC generation block 544 computes an ECC according to the write data. DB 546 stores the write data and ECC for received memory access requests. It outputs the combined write data/ECC to queue 514 when arbiter 538 picks the corresponding write access for dispatch to the memory channel.

Power controller 550 generally includes an interface 552 to an advanced extensible interface, version one (AXI), an APB interface 554, and a power engine 560. Interface 552 has a first bidirectional connection to the SMN, which includes an input for receiving an event signal labeled "EVENT_n" shown separately in FIG. 5, and an output. APB interface 554 has an input connected to the output of interface 552, and an output for connection to a PHY over an APB. Power engine 560 has an input connected to the output of interface 552, and an output connected to an input of queue 514. Power engine 560 includes a set of configuration registers 562, a microcontroller (μC) 564, a self refresh controller (SLFREF/PE) 566, and a reliable read/write training engine (RRW/TE) 568. Configuration registers 562 are programmed over the AXI bus, and store configuration information to control the operation of various blocks in memory controller 500. Accordingly, configuration registers 562 have outputs connected to these blocks that are not shown in detail in FIG. 5. Self refresh controller 566 is an engine that allows the manual generation of refreshes in addition to the automatic generation of refreshes by refresh logic 532. Reliable read/write training engine 568 provides a continuous memory access stream to memory or I/O devices for such purposes as DDR interface read latency training and loopback testing.

Memory channel controller 510 includes circuitry that allows it to pick memory accesses for dispatch to the associated memory channel. In order to make the desired arbitration decisions, address generator 522 decodes the address information into predecoded information including rank, row address, column address, bank address, and bank group in the memory system, and command queue 520 stores the predecoded information. Configuration registers 562 store configuration information to determine how address generator 522 decodes the received address information. Arbiter 538 uses the decoded address information, timing eligibility information indicated by timing block 534, and active page information indicated by page table 536 to efficiently schedule memory accesses while observing other criteria such as QoS requirements. For example, arbiter 538 implements a preference for accesses to open pages to avoid the overhead of precharge and activation commands required to change memory pages, and hides overhead accesses to one bank by interleaving them with read and write accesses to another bank. In particular during normal operation, arbiter 538 may decide to keep pages open in different banks until they are required to be precharged prior to selecting a different page.

Arbiter 538 uses timing block 534 to determine timing eligibility for pending accesses, and then picks eligible accesses from command queue 520 based on a set of criteria that ensure both efficiency and fairness. Arbiter 538 supports two mechanisms to ensure both efficiency and fairness. First, arbiter 538 performs read/write transaction management to ensure both efficiency and fairness by examining attributes of memory access requests stored in command queue 520 as well as programmable threshold values to control the conditions in which reads are allowed to proceed while writes are allowed to make progress. Second, arbiter 538 includes streak counters that ensure that streaks of accesses of certain types are not allowed to hold the memory bus indefinitely. These two mechanisms will now be described.

DDR Memory Error Recovery

As mentioned above, replay queue 530 is a temporary queue for storing memory accesses picked by arbiter 538 that are awaiting responses, such as address and command parity responses, write cyclic redundancy check (CRC) responses for DDR4 DRAM, or write and read CRC responses for GDDR5 DRAM. Replay queue 530 accesses ECC check block 542 to determine whether the returned ECC is correct or indicates an error. Replay queue 530 allows the accesses to be replayed in the case of a parity or CRC error of one of these cycles. In addition, replay queue 530 takes advantage of error reporting mechanisms available in current DDR DRAMs to make a decision about replay. By assuming that memory errors are normally temporary and that the memory channel will shortly recover, replay queue 530 provides a graceful backup and replay mechanism to avoid lengthy and disruptive recovery sequences.

Some devices support data protection on transfers (e.g., GDDR5 read and write data transfers with error detection and correction (EDC); DDR4 write data transfers protected by write CRC). GDDR5 devices provide a uni-directional EDC bus to transfer CRC data whereby the EDC values always travel from the devices to the controller independent of whether the request was a read or write. During GDDR5 read response data transfers, the EDC bundle is returned with or soon after the response data based on the parameter $t_{crcrl}$. During a write data transfer the EDC bundle is returned after the GDDR5 device receives the write data (as it calculates the EDC value from the received write data). On reads, memory controller 500 calculates the EDC value from the received read data response and compares it to the EDC data received from that read. On writes, memory controller 500 calculates the expected EDC value and temporarily stores it in memory controller 500 for later comparison with the EDC packet returned from the GDDR5 device after a write data cycle. The expected write data EDC value is stored in EDC Queue logic (EDCQ) in memory controller 500.

Memory controller 500 supports "early response" to reduce latency, and replay queue 530 returns the early response back to the memory channel "early" relative to the time the EDC response is returned. This "Early Response" support then requires that a response be "cancelled" should the EDC come back "bad". Memory controller 500 responds to the memory channel with an "early response" packet and "response cancel" should the EDC come back bad. If the EDC is returned "good" then no further action is required. Upon a failed read or write request, replay queue 530 performs a retry of the cycle request. A write request is acknowledged back to the memory channel when issued. Should the write fail, replay queue 530 retries the command and maintains write data ordering, independent of the memory channel.

DDR4 devices support CRC checking on write commands only. The CRC information is sent out along with the write data during the last two bit-times. Therefore, unlike GDDR5 EDC, CRC information is checked in the DDR4 device and the device asserts the ALERT# signal upon an error detection. Because the ALERT# signal is open-drain and considered asynchronous to the DRAM MEMCLK or any internal controller clock, thus requiring synchronization, the ability of memory controller 500 to identify the particular write transaction that caused the error in a sequence of consecutive bursts is limited, and memory controller 500 replays a range of previously issued write commands to ensure the replay of the failed write. For both GDDR5 and DDR4 memories, replay queue 530 replays the write and read transactions, and halts any new transactions being issued from command queue 520 until the failed cycles have completed successfully.

A specific implementation of replay queue 530 and its operation will now be described.

Figure 6:
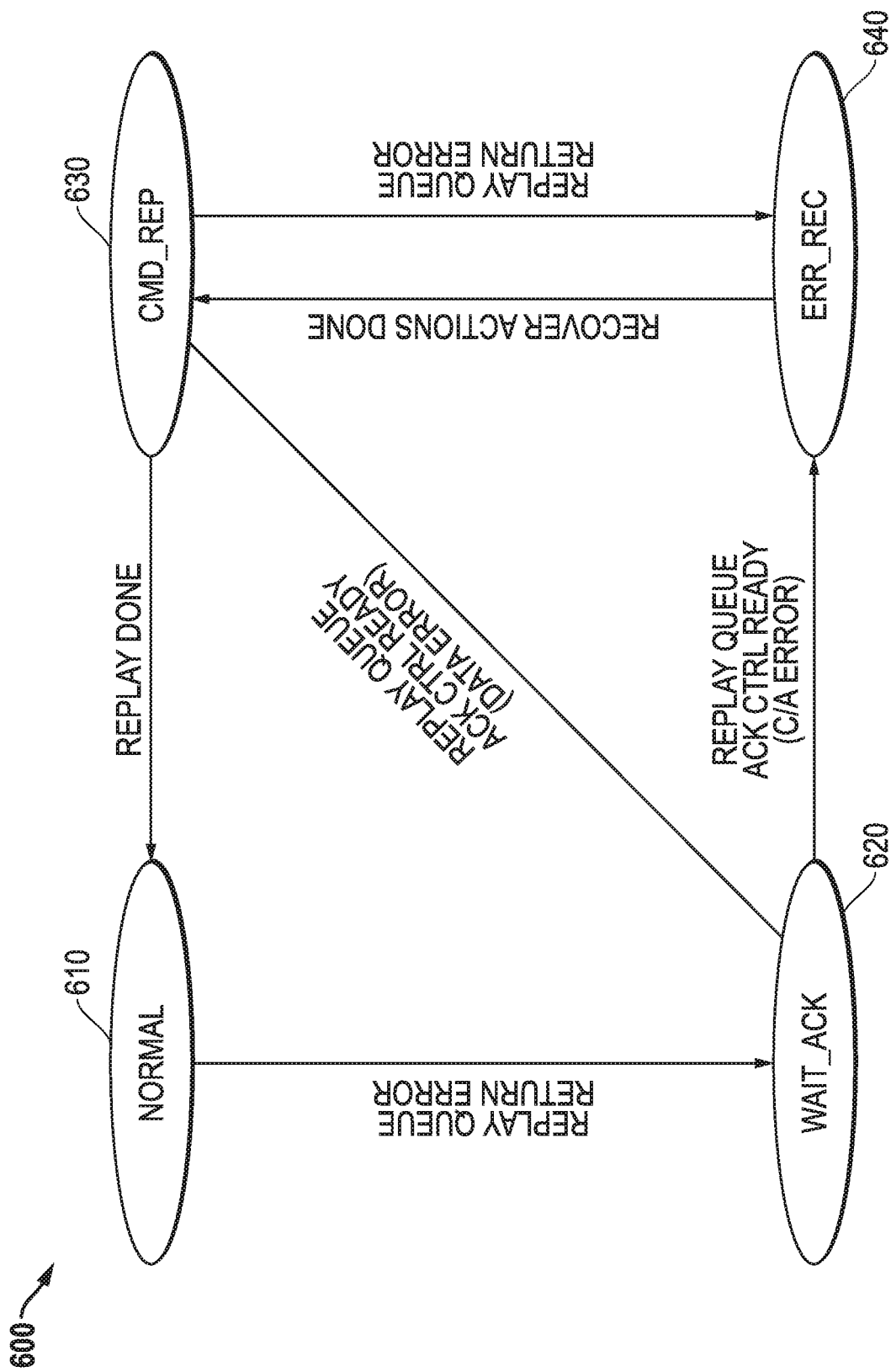
FIG. 6 illustrates a state diagram associated with the operation of a finite state machine of the memory controller of FIG. 5.

FIG. 6 illustrates a state diagram associated with the operation of a finite state machine 600 of memory controller 500 of FIG. 5. Finite state machine 600 is defined by a NORMAL state 610, a wait acknowledge state 620 labeled "WAIT_ACK", a command replay state 630 labeled "CMD_REP", and an error recovery state 640 labeled "ERR_REC". Memory controller 500 remains in NORMAL state 610 as long as there is no DRAM error detected. During this state, arbiter 538 retains control of the sequencing of memory access commands to the memory system, and sends normal traffic by picking commands from command queue 520 according to its normal priority rules. Memory controller 500 leaves NORMAL state 610 when it detects a DRAM error returned from replay queue 530, and temporarily enters WAIT_ACK state 620. Queue 514 then stops accepting commands selected by arbiter 538, and starts receiving commands from replay queue 530 in a selected recovery phase. Replay queue 530 takes control of issuing memory access commands and performs a recovery sequence based on the DRAM type and the error type. For example in the case of a command/address error in a DDR4 system, memory controller 500 enters ERR_REC state 640, and remains in this state until a wait time after replay queue 530 sends out the last recovery command to guarantee the command is provided correctly. At that time, memory controller 500 transitions to CMD_REP state 630. In CMD_REP state 630, replay queue 530 replays the command or commands on which the error may have occurred. CMD_REP state 630 ends when replay queue 530 sends out the last command on which an error may have occurred.

For example, a typical sequence proceeds as follows:
1) On bootup, finite state machine 600 starts in NORMAL state 610.
2) For DDR4 systems, replay queue 530 samples an error (ALERT_n=0), or in GDDR5 systems, once replay queue 530 receives a CRC error returned from queue 514, it requests control from queue 514, and finite state machine 600 moves to WAIT_ACK state 620.
3) Arbiter 538 and queue 514 need to wake any DRAMs from power down mode before acknowledging the recovery request, and disable dynamic power down while replay queue 530 is taking control.
4) Once queue 514 acknowledges the request, state machine 600 either moves to ERR_REC state 640 to perform a command/address error recovery sequence, or moves to CMD_REP state 630 directly.
5) Once command/address error recovery is done, then state machine 600 moves to CMD_REP state 630.
6) In CMD_REP state 630, the error transactions get replayed and resent to the memory system. In case of further errors, state machine 600 will stay in CMD_REP state 630 or move to ERR_REC state 640 in the case of a command/address error.
7) Once replay is done and a cool down time has passed, replay queue 530 releases control of transactions to arbiter 538, and finite state machine 600 returns to NORMAL state 610 and memory controller 500 is again ready to provide normal commands. If memory controller 500 replays a memory command and receives an error for a predefined number of times, it indicates a system error. The incidence of repeated errors indicates a real system failure instead of a temporary condition on the memory bus, and it requires other remedial action to be taken by the operating system.

The memory controller of FIG. 5 may be implemented with various combinations of hardware and software. For example, the hardware circuitry may include priority encoders, finite state machines, programmable logic arrays (PLAs), and the like. For example, arbiter 538 could be implemented with a microcontroller executing stored program instructions to evaluate the relative timing eligibility of the pending commands. In this case, some of the instructions may be stored in a non-transitory computer memory or computer readable storage medium for execution by the microcontroller. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The memory controller of FIG. 5 or any portion thereof, such as replay queue 530, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates that also represent the functionality of the hardware comprising integrated circuits. The netlist is then placed and routed to produce a data set describing geometric shapes to be applied to masks. The masks are then used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory channel controller 510 and/or power engine 550 may vary in different embodiments. Memory controller 500 may interface to other types of memory besides DDRx memory, such as high bandwidth memory (HBM), RAMbus DRAM (RDRAM), and the like. While the illustrated embodiment showed each rank of memory corresponding to separate DIMMs, in other embodiments each DIMM can support multiple ranks.

Accordingly, it is intended by the appended claims to cover all modifications of the disclosed embodiments that fall within the scope of the disclosed embodiments.

What is claimed is:

1. A memory controller, comprising:
a command queue for receiving and storing memory access requests;
an arbiter coupled to said command queue for providing a sequence of memory commands to a memory channel; and
a replay queue for storing said sequence of memory commands to said memory channel, and continuing to store memory access commands that have not yet received responses from said memory channel, wherein:
when a response indicates a completion of a corresponding memory command without any error, said replay queue removes said corresponding memory command without taking further action; and
when a response indicates an error and said memory channel comprises a memory of a first type, said replay queue replays said corresponding memory command on which said error occurred, and when said memory is a second type, said replay queue replays a sequence of consecutive, previously issued memory commands on which said error may have occurred.

2. The memory controller of claim 1, wherein said response comprises one of an address and command parity response, a write data cyclic redundancy code (CRC) response, and an error correcting code (ECC) error response.

3. The memory controller of claim 1, further comprising:
an error correcting code (ECC) check block coupled to said replay queue for calculating an ECC of said corresponding memory command and comparing a calculated ECC to a returned ECC from said memory channel.

4. The memory controller of claim 1, further comprising:
a memory interface queue coupled to said command queue for receiving and storing memory access requests, wherein said memory interface queue is further coupled to said replay queue for providing commands that have been dispatched to said memory channel and responses that have been received from said memory channel in response to said commands.

5. The memory controller of claim 4, wherein:
in response to receiving a response from said memory interface queue, said replay queue determines that there was an error in said response by calculating an error correcting code and comparing said error correcting code with an error correcting code received from said memory channel.

6. The memory controller of claim 4, wherein:
in response to receiving a response from said memory interface queue with an error, said replay queue replays said corresponding memory command and any additional command provided by said memory interface queue to said memory channel after said corresponding memory command.

7. A memory controller, comprising:
a command queue for receiving and storing memory access requests; and
an arbiter coupled to said command queue for providing a sequence of memory commands to a memory channel;
a memory interface queue coupled to said command queue for receiving and storing memory access requests; and
a replay queue coupled to said memory interface queue for storing said sequence of memory commands to said memory channel, and continuing to store memory access commands that have not yet received responses from said memory channel, wherein:
said memory controller remains in a normal state as long as it does not detect any errors, wherein in said normal state said memory interface queue continues to receive commands from said command queue that are picked by said arbiter; and
in response to detecting an error and said memory channel comprises a memory of a first type, said memory controller enters a recovery state in which said replay queue replays a corresponding memory command on which said error occurred, and when said memory is a second type, said replay queue replays a sequence of consecutive, previously issued memory commands on which said error may have occurred by sending said corresponding memory command to said memory interface queue.

8. The memory controller of claim 7, wherein:
the memory controller remains in said recovery state until said replay queue replays all memory commands that generated memory errors without any further error.

9. The memory controller of claim 7, wherein:
the memory controller transitions to an error recovery state in response to a command and address error, and to a command replay state in response to a data error.

10. The memory controller of claim 9, wherein:
the memory controller transitions from said error recovery state to said command replay state in response to replaying commands on which an error may have occurred.

11. The memory controller of claim 10, wherein:
the memory controller transitions from said command replay state to said normal state in response to receiving responses to all replayed commands without error.

12. The memory controller of claim 10, wherein:
in response to a further error, the memory controller transitions to said error recovery state if said further error was a command/address error, or transitions to said command replay state otherwise.

13. The memory controller of claim 7, wherein:
the memory controller indicates a system error in response to replaying said corresponding memory command and receiving an error, for a predetermined number of times.

14. A data processing system, comprising:
a memory accessing agent for providing memory access requests;
a memory system; and a memory controller coupled to said memory accessing agent and said memory system, comprising:
  a command queue for receiving and storing memory access requests;
  an arbiter coupled to said command queue for providing a sequence of memory commands to said memory system; and
  a replay queue for storing said sequence of memory commands to said memory system, and continuing to store memory access commands that have not yet received responses from said memory system, wherein:
  when a response indicates a completion of a corresponding memory command without any error, said replay queue removes said corresponding memory command without taking further action; and
  when a response indicates an error and said memory system comprises a memory of a first type, said replay queue replays said corresponding memory command on which said error occurred, and when said memory is a second type, said replay queue replays a sequence of consecutive, previously issued memory commands on which said error may have occurred.

15. The data processing system of claim 14, wherein said response comprises an address and command parity response.

16. The data processing system of claim 14, further comprising:
an error correcting code (ECC) check block coupled to said replay queue for calculating an ECC of said corresponding memory command and comparing a calculated ECC to a returned ECC from said memory system.

17. The data processing system of claim 14, wherein said memory controller further comprises:
a memory interface queue coupled to said command queue for receiving and storing memory access requests, wherein said memory interface queue is further coupled to said replay queue for providing commands that have been dispatched to said memory system and responses that have been received from said memory system in response to said commands.

18. The data processing system of claim 17, wherein:
in response to receiving a response from said memory interface queue, said replay queue determines that there was an error in said response by calculating an error correcting code and comparing said error correcting code with an error correcting code received from said memory system.

19. The data processing system of claim 17, wherein:
in response to receiving a response to a write command from said memory interface queue, said replay queue replays said write command and any additional write command provided by said memory interface queue to said memory system.

20. The data processing system of claim 17, wherein:
said memory controller remains in a normal state as long as it does not detect any memory errors, wherein in said normal state said memory interface queue continues to receive commands from said command queue that are picked by said arbiter; and
in response to detecting an error, the memory controller enters a recovery state in which said replay queue replays at least one corresponding memory command by sending said at least one corresponding memory command to said memory interface queue.

21. The data processing system of claim 20, wherein:
the memory controller waits for an acknowledgment that at least one memory has been awakened from a power down state before entering said recovery state.

22. The data processing system of claim 20, wherein:
the memory controller remains in said recovery state until said replay queue replays all memory commands that generated memory errors without any further error.

23. The data processing system of claim 20, wherein:
the memory controller transitions to an error recovery state in response to a command and address error, and to a command replay state in response to a data error.

24. The data processing system of claim 23, wherein:
the memory controller transitions from said error recovery state to said command replay state in response to replaying commands on which an error may have occurred.

25. The data processing system of claim 24, wherein:
the memory controller transitions from said command replay state to said normal state in response to receiving responses to all replayed commands without error.

26. The data processing system of claim 25, wherein:
in response to a further error, the memory controller moves to said error recovery state if said further error was a command/address error, or moves to said command replay state otherwise.

27. The data processing system of claim 20, wherein:
the memory controller remains in said recovery state until said replay queue replays all memory commands that generated memory errors without any further error.

* * * * *